(12) United States Patent
Coker et al.

(10) Patent No.: US 7,986,488 B2
(45) Date of Patent: Jul. 26, 2011

(54) MAGNETIC RECORDING DISK AND DISK DRIVE WITH ALTERNATING SINGLE-POLARITY POSITION ERROR SIGNAL (PES) BLOCKS FOR READ/WRITE HEAD POSITIONING

(75) Inventors: Jonathan Darrel Coker, Rochester, MN (US); David Timothy Flynn, Mantorville, MN (US); Joel Dale Haugen, Rochester, MN (US); Neil Krishnaswamy, Rochester, MN (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 186 days.

(21) Appl. No.: 12/328,684

(22) Filed: Dec. 4, 2008

(65) Prior Publication Data
US 2010/0142085 A1   Jun. 10, 2010

(51) Int. Cl.
*G11B 5/596* (2006.01)
*G11B 5/09* (2006.01)
(52) U.S. Cl. ...................... 360/77.08; 360/48
(58) Field of Classification Search ............... None
See application file for complete search history.

(56) References Cited

U.S. PATENT DOCUMENTS

| 4,423,450 | A | * | 12/1983 | Hamilton | 360/111 |
| 4,912,585 | A | * | 3/1990 | Belser et al. | 360/135 |
| 5,255,131 | A | | 10/1993 | Coker et al. | |
| 5,384,671 | A | | 1/1995 | Fisher | |
| 5,600,506 | A | | 2/1997 | Baum et al. | |
| 6,025,970 | A | * | 2/2000 | Cheung | 360/77.08 |
| 6,426,845 | B1 | | 7/2002 | Sacks et al. | |
| 6,433,950 | B1 | * | 8/2002 | Liikanen | 360/77.08 |
| 6,469,849 | B1 | | 10/2002 | Ellis et al. | |
| 6,754,016 | B2 | * | 6/2004 | Messner et al. | 360/48 |
| 7,123,434 | B2 | * | 10/2006 | Roth | 360/77.08 |
| 7,206,146 | B2 | | 4/2007 | Flynn et al. | |
| 7,230,790 | B1 | * | 6/2007 | Mallary et al. | 360/77.08 |
| 7,436,611 | B2 | * | 10/2008 | Nishida et al. | 360/48 |
| 2005/0141123 | A1 | | 6/2005 | Roth | |

* cited by examiner

*Primary Examiner* — Daniell L Negrón
(74) *Attorney, Agent, or Firm* — Thomas R. Berthold

(57) ABSTRACT

A magnetic recording disk drive has a position-error-signal (PES) servo pattern divided into at least two circumferentially adjacent fields that extend radially across the data tracks and include PES blocks that are DC magnetized in one direction, with each PES block having a magnetization opposite to the magnetization of its radially adjacent neighboring PES blocks. Each PES field is contiguous with and shifted radially relative to its circumferentially adjacent neighbor PES fields. Each PES block has a single DC magnetization, and the length of the magnetization is substantially longer than the length of the magnetizations in the other fields of the servo pattern.

8 Claims, 8 Drawing Sheets

US 7,986,488 B2

MAGNETIC RECORDING DISK AND DISK DRIVE WITH ALTERNATING SINGLE-POLARITY POSITION ERROR SIGNAL (PES) BLOCKS FOR READ/WRITE HEAD POSITIONING

BACKGROUND OF THE INVENTION

1. Field of the Invention

This invention relates generally to data recording systems, such as magnetic recording hard disk drives, and more particularly to pre-recorded servo patterns and servo positioning systems to locate and maintain the read/write heads on the data tracks.

2. Description of the Related Art

Magnetic recording hard disk drives use a servo-mechanical positioning system to hold the read/write head on the desired data track and to seek from track to track as required to perform read and write operations. Special "servo" information is written in fields in circumferentially-spaced servo sectors in each of the concentric data tracks on each disk surface. The servo pattern is constructed across multiple tracks so that the readback signal from the head, as it passes over the pattern, can be decoded to yield the position error signal (PES) that represents the radial position of the head. The servo pattern is written onto the disk during manufacturing in a process known as servowriting. In conventional servowriting the servo pattern is written in multiple passes using the regular write head in conjunction with a specialized servowriter. The servo pattern may also be written using a magnetically printed preliminary pattern followed by a detailed final pattern, by a media-level servowriter (e.g., a stack of 10 disks servowritten with servowriting heads), or by self-servowriting by the disk drive without a specialized servowriter.

One common servo pattern is a quad-burst pattern of four fields of PES bursts. The standard PES decoder for the quad-burst pattern is relatively complex hardware or software that uses sinusoidal processing techniques, such as a single-point discrete Fourier Transform (DFT).

It is desirable to reduce the amount of disk surface area used by the servo pattern. The standard and most straightforward approach to achieve this reduction is to increase the frequency (or density) of the information in the servo pattern. However, this approach is limited by the tradeoff between servowriter yield, costs to upgrade the servowriter, and increased complexity of the PES decoder.

What is needed is a servo pattern that is easy to servowrite, reduces the amount of disk surface area required, and does not require complex signal processing hardware or software to decode the PES.

SUMMARY OF THE INVENTION

The invention relates to a magnetic recording disk drive that has a PES pattern divided into at least two circumferentially adjacent fields that extend radially across the data tracks and include PES blocks that are DC magnetized in one direction, with each PES block having a magnetization opposite to the magnetization of its radially adjacent neighboring PES blocks. Each PES field is contiguous with and shifted radially relative to its circumferentially adjacent neighbor PES fields. Each PES block has a single DC magnetization, and the length of the magnetization is substantially longer than the length of the magnetizations in the other fields of the servo pattern. For perpendicular recording, a servo pattern with each PES block having only a single magnetization either into or out of the plane of the recording layer gives maximum amplitude as well as minimum noise because there are no transitions within the individual blocks. Additionally, the PES blocks are easier to servowrite because there is minimal alignment required from track to track. The PES decoder for the PES fields can be based on generalized matched-filter concepts. The PES blocks having the relatively long circumferential field lengths, the contiguous circumferential placement of adjacent PES fields, and the single-step transition between the PES fields produces PES fields that perform like the prior art but that are one-third to one-fourth the physical size in the circumferential direction. The PES pattern may be used with patterned-media disks, in which case the PES pattern contains discrete PES blocks physically separated from adjacent PES blocks by nonmagnetic spaces.

For a fuller understanding of the nature and advantages of the present invention, reference should be made to the following detailed description taken together with the accompanying figures.

DETAILED DESCRIPTION OF THE INVENTION

Figure 1:
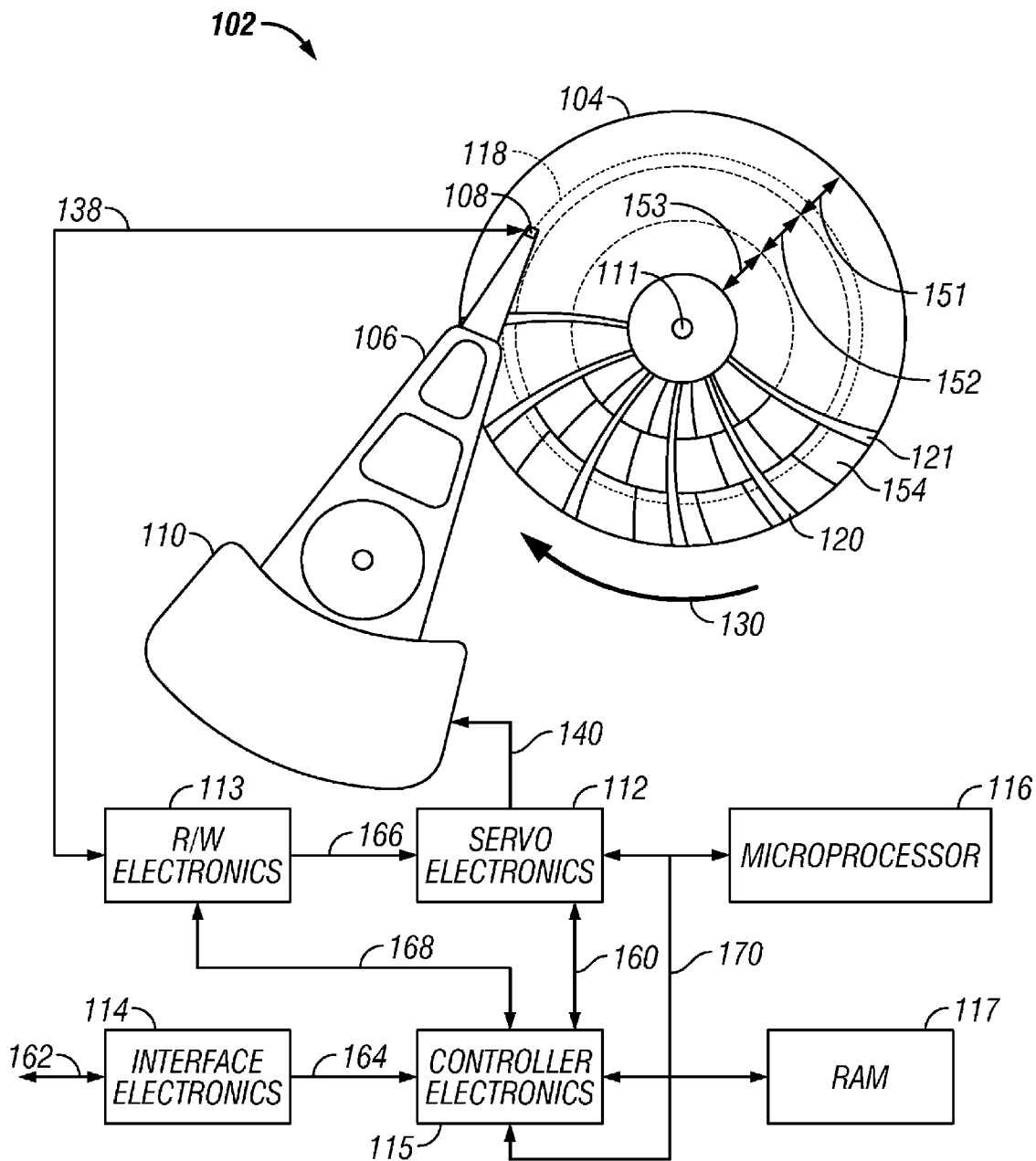
FIG. 1 is a block diagram of a prior art disk drive of the type usable with the present invention.

FIG. 1 is a block diagram of a disk drive of the type usable with the present invention. The disk drive depicted is one that is formatted using a fixed-block "headerless" architecture with sector servo and zone-bit recording (ZBR).

The disk drive, designated generally as 102, includes data recording disk 104, actuator arm 106, data recording transducer 108 (also called a head, recording head or read/write head), voice coil motor 110, servo electronics 112, read/write electronics 113, interface electronics 114, controller electronics 115, microprocessor 116, and RAM 117. The recording head 108 may be an inductive read/write head or a combination of an inductive write head with a magnetoresistive read head. Typically, there are multiple disks stacked on a hub that is rotated by a disk motor, with a separate recording head associated with each surface of each disk. Data recording disk 104 has a center of rotation 111 and is rotated in direction 130. Disk 104 is divided for head positioning purposes into a set of radially-spaced concentric tracks, one of which is shown as track 118. The tracks are grouped radially into a number of zones, three of which are shown as zones 151, 152 and 153. Each track includes a plurality of circumferentially or angularly-spaced servo sectors. The servo sectors in each track are aligned circumferentially with the servo sectors in the other tracks so that they extend across the tracks in a generally radial direction, as represented by radially-directed servo sections 120. Each track has a reference index 121 indicating the start of track. Within each zone, the tracks are also circumferentially divided into a number of data sectors 154 where user data is stored. In this example the data sectors contain no data sector identification (ID) fields for uniquely identifying the data sectors so the drive is considered to have a "No-ID"™ type of data architecture, also called a "headerless" data architecture. If the disk drive has multiple heads, then the set of tracks which are at the same radius on all disk data surfaces is referred to as a "cylinder".

Read/write electronics 113 receives signals from head 108, passes servo information from the servo sectors to servo electronics 112, and passes data signals to controller electronics 115. Servo electronics 112 uses the servo information to produce a current at 140 which drives voice coil motor 110 to position head 108. Interface electronics 114 communicates with a host system (not shown) over interface 162, passing data and command information. Interface electronics 114 also communicates with controller electronics 115 over interface 164. Microprocessor 116 communicates with the various other disk drive electronics over interface 170.

In the operation of disk drive 102, interface electronics 114 receives a request for reading from or writing to data sectors 154 over interface 162. Controller electronics 115 receives a list of requested data sectors from interface electronics 114 and converts them into zone, cylinder, head, and data sector numbers which uniquely identify the location of the desired data sectors. The head and cylinder information are passed to servo electronics 112, which positions head 108 over the appropriate data sector on the appropriate cylinder. If the cylinder number provided to servo electronics 112 is not the same as the cylinder number over which head 108 is presently positioned, servo electronics 112 first executes a seek operation to reposition head 108 over the appropriate cylinder.

Once servo electronics 112 has positioned head 108 over the appropriate cylinder, servo electronics 112 begins executing sector computations to locate and identify the desired data sector. As servo sectors pass under head 108, the headerless architecture technique identifies each servo sector. In brief, a servo timing mark (STM) is used to locate servo sectors, and a count of STMs from a servo sector containing an index mark 121 uniquely identifies each servo sector. If the disk drive uses the older architecture with headers, then every sector is marked with a field containing a servo sector number which is read by the servo electronics and used to uniquely identify each servo sector. Additional information is maintained in association with servo electronics 112 and controller electronics 115 for controlling the reading or writing of data in the data sectors.

Figure 2A:
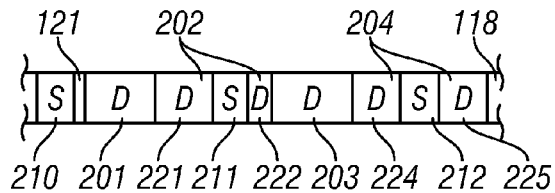
FIG. 2A is a portion of a typical data track on the disk of the disk drive shown in FIG. 1.

Referring now to FIG. 2A, a portion of a typical track 118 on the disk 104 is shown expanded. Four complete data sectors are shown (201, 202, 203 and 204). Three representative servo sectors 210, 211, and 212 are also shown. As can be seen from this example, some data sectors are split by servo sectors, and some data sectors do not start immediately following a servo sector. For example, data sectors 202 and 204 are split by servo sectors 211 and 212, respectively. Data sector 202 is split into data sections 221 and 222, and data sector 204 is split into data sections 224 and 225. Data sector 203 starts immediately after the end of data sector 202, rather than immediately following a servo sector. The index mark 121 indicates the beginning of the track and is shown contained in servo sector 210.

Figure 2B:
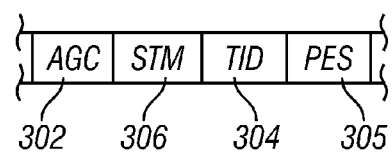
FIG. 2B is an expanded view of one of the servo sectors in the data track of FIG. 2A.

FIG. 2B is an expanded view of one of the servo sectors illustrated in FIG. 2A. The servo sectors are nondata regions that cannot be erased during normal operation of the disk drive. Typically, each servo sector contains an STM 306. The STM 306 serves as a timing reference for reading the subsequent servo information in track identification (TID) field 304 and position error signal (PES) field 305. The STM is sometimes also referred to as a servo address mark, servo identification (SID), or servo start mark. Each servo sector also contains an automatic gain control (AGC) field 302 for controlling a variable gain amplifier (VGA) that adjusts the strength of the signal read by head 108.

Figure 3:
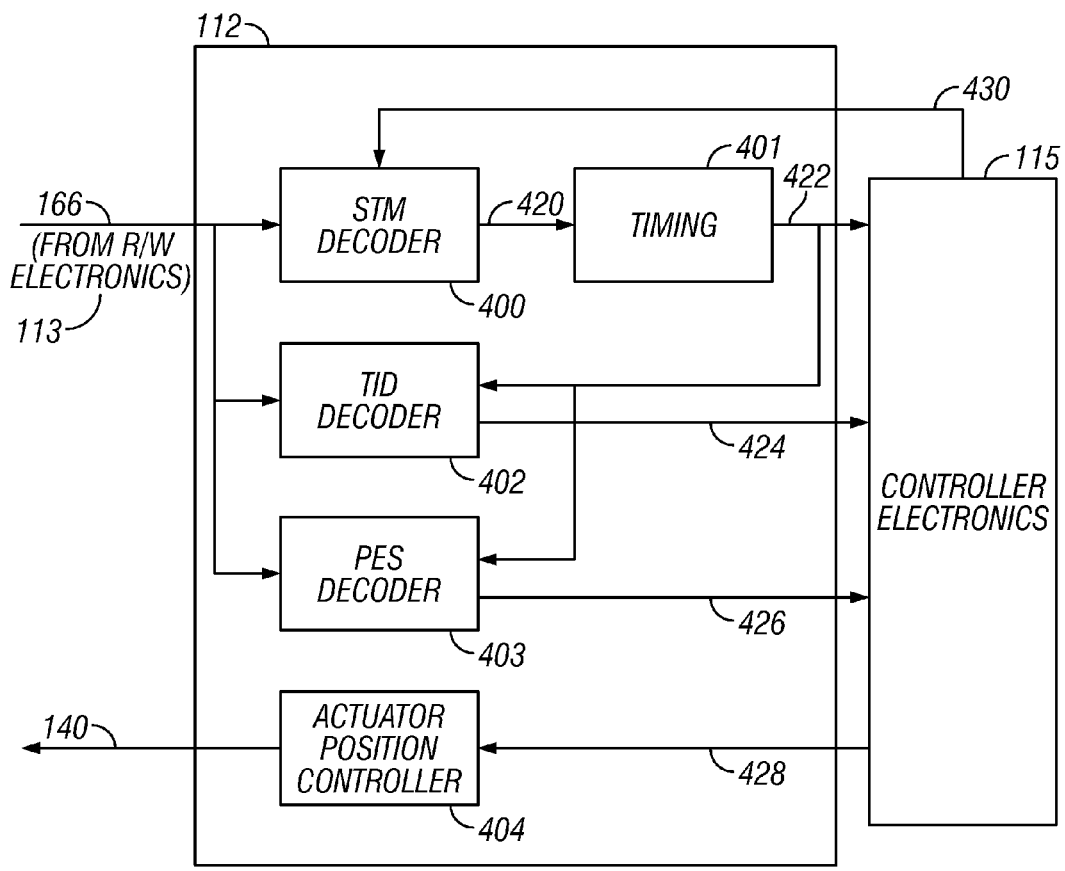
FIG. 3 is a block diagram of the servo electronics in the prior art disk drive in FIG. 1.

FIG. 3 is a block diagram of the servo electronics 112. In operation, controller electronics 115 provides input to actuator position control 404, which in turn provides a signal 140 to the actuator to position the head. The controller electronics 115 uses the servo information read from the servo sectors to determine the input 428 to the actuator position control 404. The servo information is read by the read/write electronics 113 (FIG. 1), and signals 166 are input to the servo electronics 112. STM decoder 400 receives a clocked data stream 166 as input from the read/write electronics 113, and a control input 430 from the controller electronics 115. Once an STM has been detected, an STM found signal 420 is generated. The STM found signal 420 is used to adjust timing circuit 401, which controls the operating sequence for the remainder of the servo sector.

After detection of an STM, the track identification (TID) decoder 402 receives timing information 422 from timing circuit 401, reads the clocked data stream 166, which is typically Gray-code encoded, and then passes the decoded TID information 424 to controller electronics 115. Subsequently, PES decode circuit 403 captures the PES signal from read/write electronics 166, then passes position information 426 to controller electronics 115. Inputs to the PES decode circuit 403 are typically analog, although they may be digital or of any other type. The PES decode circuit 403 need not reside within the servo electronics module 112.

Figure 4:
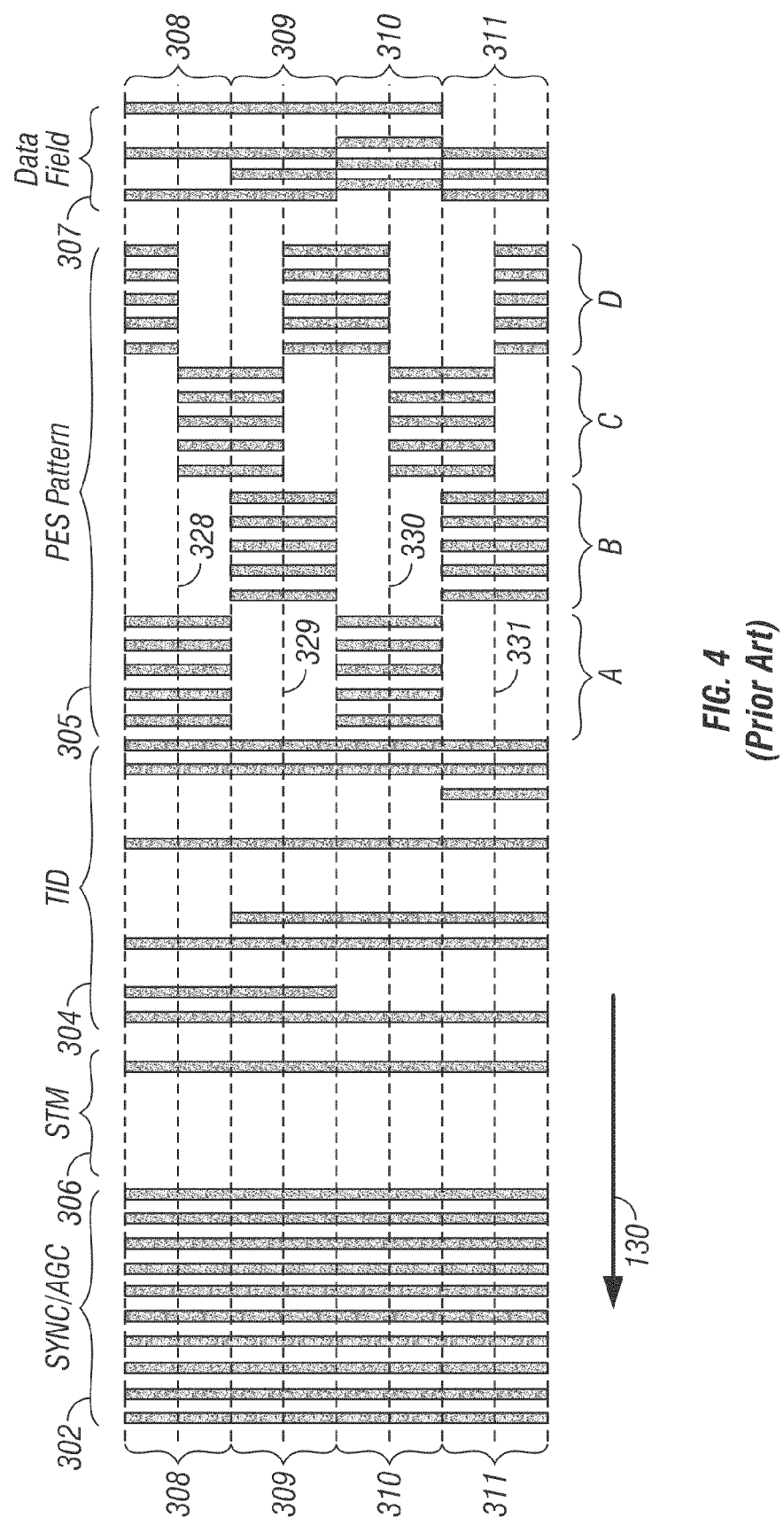
FIG. 4 is a schematic of prior art servo pattern with a quad-burst position error signal (PES) pattern.

FIG. 4 is a schematic of a portion of a data field 307 and a conventional servo pattern of the type commonly used in sector servo systems. FIG. 4 shows a greatly simplified pattern for clarity with only four data tracks (tracks 308, 309, 310 and 311 having track centerlines 328, 329, 330 and 331, respectively). The servo pattern precedes the data field 307 and moves relative to head 108 in the direction shown by arrow 130. The two possible magnetic states of the medium are indicated as black and white regions. FIG. 4 shows the servo pattern in only four radially-adjacent servo sectors in one servo section 120 of the disk, but the pattern extends radially through all the data tracks in each servo section 120.

The servo pattern is comprised of four distinct patterns: SYNC/AGC field 302, STM field 306, Track ID field 304 and PES pattern 305. The servo positioning information in PES pattern 305 is a conventional quad-burst pattern comprising bursts A-D. The synchronization/automatic gain control (SYNC/AGC) field 302 is a regular series of transitions and is nominally the same at all radial positions. The SYNC/AGC field 302 allows the servo controller to calibrate timing and gain parameters for later fields. The STM field 306 is the same at all radial positions. The STM pattern is chosen such that it does not occur elsewhere in the servo pattern and does not occur in the data records. The STM is used to locate the end of the SYNC/AGC field and to help locate the servo pattern when the disk drive is initialized. The TID field 304 contains the track number, usually Gray-coded and written as the presence or absence of recorded dibits. The TID field 304 determines the integer part of the radial position. The position error signal (PES) pattern 305 includes bursts A-D that are used to determine the fractional part of the radial position. Each PES burst A-D comprises a series of regularly spaced magnetic transitions, the transitions being the transitions between the alternating black and white regions in FIG. 4. The PES bursts are arranged radially such that a burst of transitions are one track wide and two tracks apart, from data track centerline to centerline. Thus, for example all A bursts are aligned radially and form PES field-A. The PES bursts are offset from their neighbors such that when the head is centered over an even-numbered data track (e.g., track 310 with centerline 330) the read-back signal from burst A is maximized, the read-back signal from burst B is minimized and the read-back signal from bursts C and D are equal. As the head moves off-track in one direction (downwards in FIG. 4) the read-back signal from burst C increases and the read-back signal from burst D decreases until, with the head half-way between tracks the read-back signal from burst C is maximized, read-back signal from burst D is minimized and read-back signals from bursts A and B are equal. As the head continues to move in the same direction the read-back signal from burst B increases and the read-back signal from burst A decreases until, with the head centered over the next track (with an odd track number, e.g. track 311 with centerline 331) the read-back signal from burst B is maximized, the read-back signal from burst A is minimized and the read-back from signals from bursts C and D are again equal. The prior art servo pattern shown in FIG. 4 is written track-by-track, in half-track steps, with a regular write head.

Figure 5:
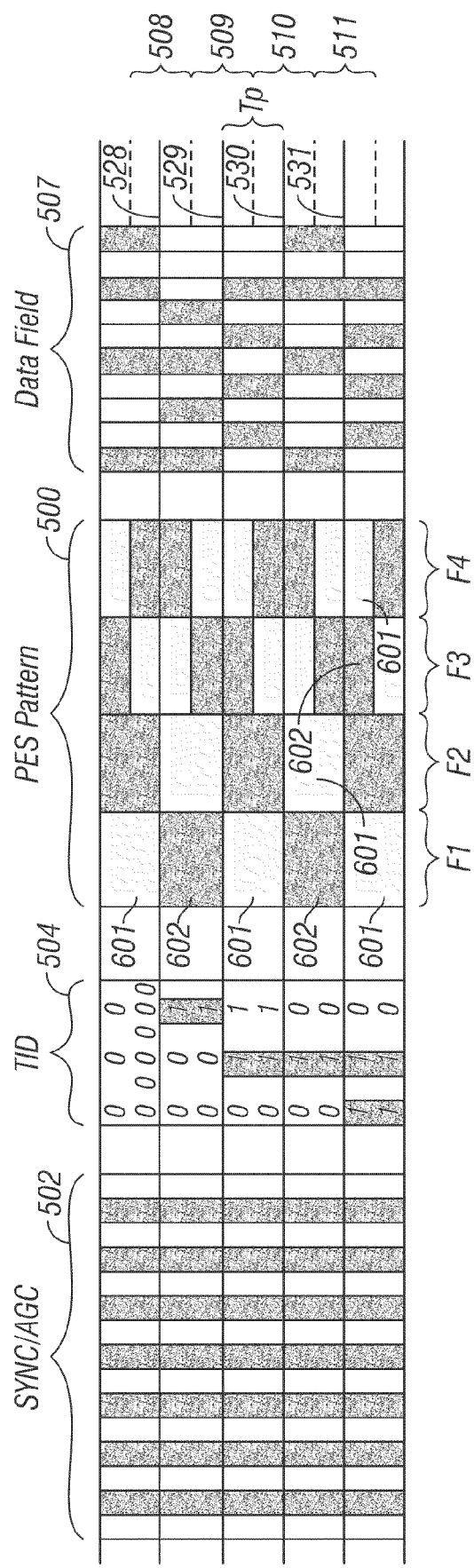
FIG. 5 is a schematic of the PES pattern according to this invention shown together with other nondata fields and a portion of a data field.

FIG. 5 is a schematic of the PES pattern 500 according to this invention shown together with SYNC/AGC field 502, TID field 504 and a portion of data field 507. In this invention the disk includes a perpendicular magnetic recording layer so the black and white regions represent opposite-polarity magnetizations into and out-of the plane of the recording layer. Data field 507 is shown with four data tracks 508, 509, 510, 511 with track centerlines 528, 529, 530, 531, respectively. The PES pattern is divided into four circumferentially adjacent fields F1, F2, F3 and F4. Each of fields F1-F4 extends radially across the tracks and includes PES blocks, like blocks 601, 602. Each of the PES blocks is DC magnetized in one direction, with each PES block having a magnetization opposite to the magnetization of its radially adjacent neighboring PES blocks. Thus, for example, blocks 601 may be magnetized into the plane of the recording layer and blocks 602 magnetized out of the plane of the recording layer. Also, each field is contiguous with and shifted radially relative to its circumferentially adjacent neighbor fields. For example, F2 is shifted radially relative to F1 by a distance equal to the radial height of a PES block, F3 is shifted radially relative to F2 by a distance equal to one-half the radial height of a PES block, and F4 is shifted radially relative to F3 by a distance equal to the radial height of a PES block. In the embodiment of FIG. 5, the radial height of a PES block is equal to the data track pitch Tp, which is the spacing between data track centerlines 528, 529, 530, 531.

In prior art servo patterns, like that shown in FIG. 4, the frequency of the magnetization reversals or transitions in the PES bursts A-D is relatively high and substantially the same as the frequency in the other portions of the servo pattern, such as the SYNC/AGC field 302 and the TID field 304. In this invention each PES block has a single DC magnetization, and the length of the magnetization is substantially longer than the length of the magnetizations in the other fields of the servo pattern. For example, as shown in FIG. 5, each PES block may have a circumferential length more than 3 times as long as the length of a magnetized region in the SYNC/AGC field 502. For perpendicular recording, a servo pattern with each PES block having only a single magnetization gives maximum amplitude as well as minimum noise because there are no transitions within the blocks. Additionally, these PES blocks are easier to servowrite because there is minimal alignment required from track to track. The PES fields F1-F4 may be servowritten by writing DC magnetizations side-by-side with opposite polarities.

Figure 6:
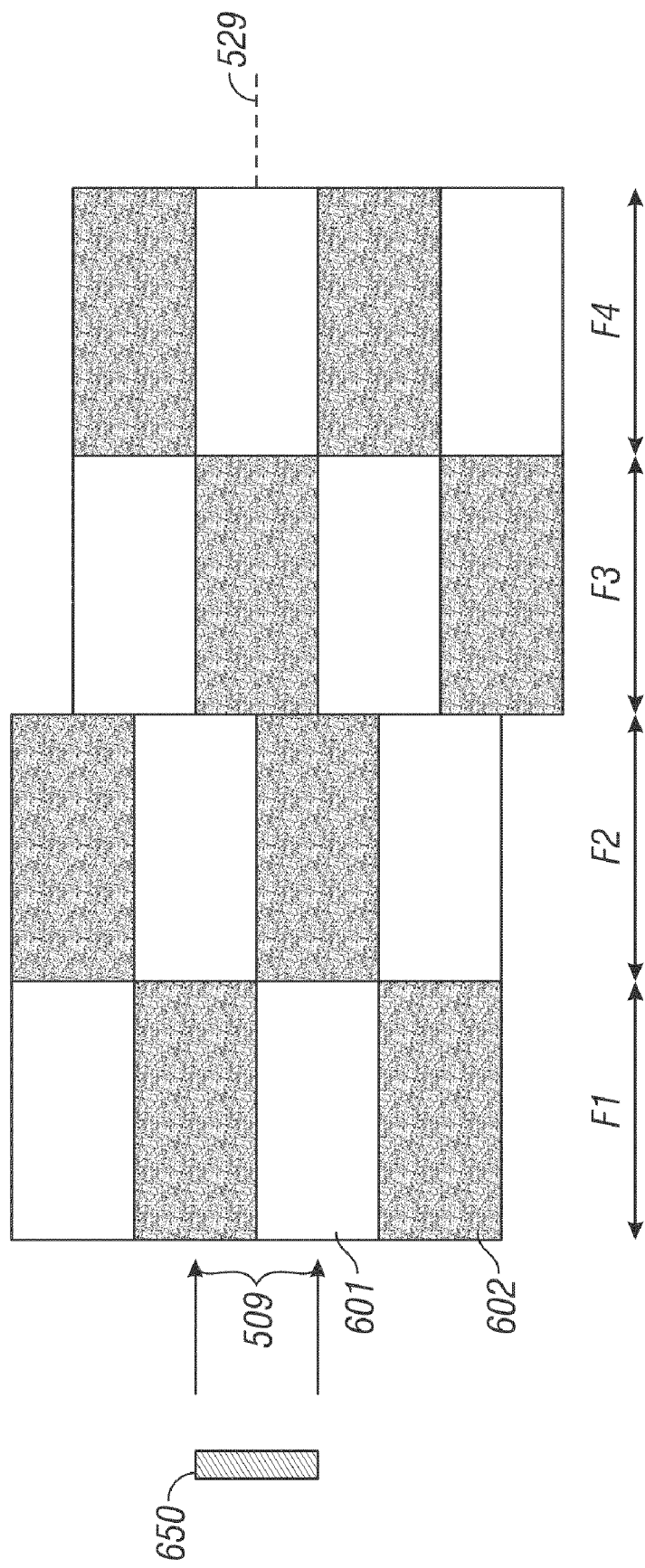
FIG. 6 is a schematic showing the four fields F1-F4 of the PES pattern according to this invention with a magnetoresistive (MR) read head aligned at the centerline of a data track.

The PES signal is then generated by taking the average value of the readback signal during the circumferential length of the field. FIG. 6 is a schematic showing the four fields F1-F4 with a magnetoresistive (MR) read head 650 aligned at the centerline 529 of track 509. To eliminate the practical issues of DC offsets in circuits and nonlinearities in the MR sensor, the blocks are aligned circumferentially to have a single step function in the middle between F1 and F2, and between F3 and F4. One method for calculation of the PES value is given by the following equations (1) and (2):

$$PES\text{-}12 = (V1-V2)/[ABS(V1-V2)+ABS(V3-V4)] \quad \text{Eq. (1)}$$

$$PES\text{-}34 = (V3-V4)/[ABS(V1-V2)+ABS(V3-V4)] \quad \text{Eq. (2)}$$

where V1-V4 represent the readback voltage of the signal from the MR head for fields F1-F4, respectively, and PES-12, PES-34 represent the PES values for successive fields F1-F2 and F3-F4, respectively.

Figure 7:
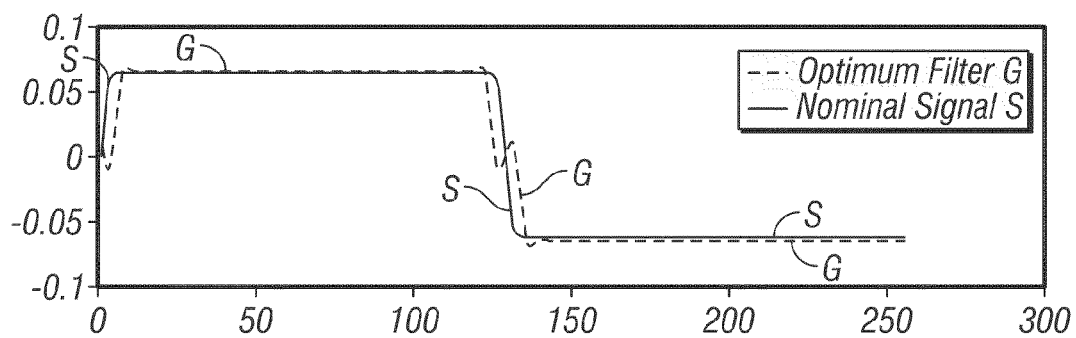
FIG. 7 is a graph of the optimum matched filter for the single-step waveform from two fields of the PES pattern according to the invention, and for the expected nominal signal from the MR head as the head passes the two fields.

The PES decoder for the PES fields can be based on generalized matched-filter concepts. FIG. 7 shows the optimum matched filter "G" for the single-step waveform, for example at the step between F1 and F2, in the presence of pure jitter noise at the transition between F1 and F2. The line marked "S" in FIG. 7 represents the expected nominal signal from the MR head as the head passes fields F1 and F2. The head position is determined as the average voltage from F1 minus the average voltage from F2. In an implementation of the matched filter that is an approximation of the optimum matched filter, the information near the transition between F1 and F2 may be deleted by zeroing the tap weights of the matched filter in that area, and the remaining information is a set of constant tap weights in the initial part, i.e., simply a sum, and a set of constant tap weights in the opposite direction in the latter part, i.e., again simply a sum. The final result of the approximated matched filter is thus the difference between the two sums. The performance of this approximated optimum matched filter is nearly as good as the optimum matched filter because the samples in the middle near the transition are noisy and small. By ignoring a few samples near the transition the filter becomes relatively insensitive to the absolute location of the transition. This loosens the specification for the servowriter because the track-to-track phase error may be a fraction of the whole circumferential length of the field, rather than a small fraction of a short high-frequency burst, as in the prior art.

Figure 8:
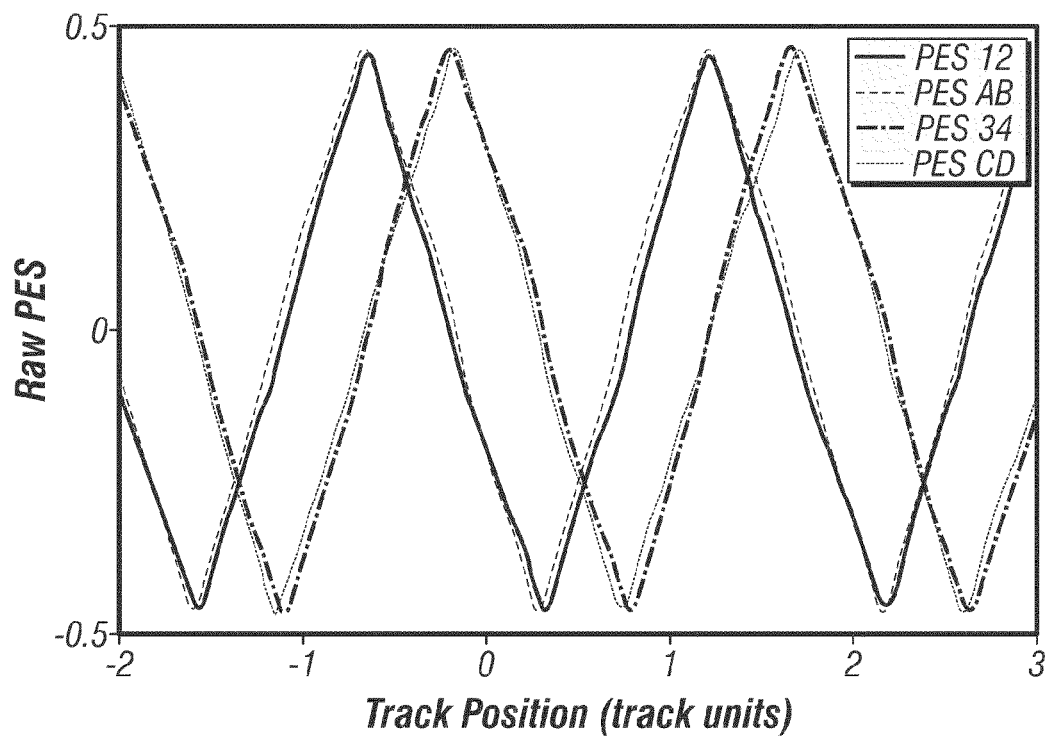
FIG. 8 is a comparison of the linearity of the PES for the PES pattern according to the invention with the PES pattern according to the prior art.

Experimental testing of the PES pattern according to the invention shows that the relatively long circumferential lengths, the contiguous circumferential placement of adjacent fields, and the single-step transition between the fields produces PES fields that perform like the prior art but that are one-third to one-fourth the physical size in the circumferential direction. FIG. 8 is a comparison of the linearity of the PES for the PES pattern according to the invention with the PES pattern according to the prior art. In FIG. 8, either PES-12 or PES-34 is used to determine head position, depending upon which half-track portion between two track centerlines the head is located. For example, if the head is between track 0 and track +0.5, PES-34 is used, and if the head is between track +0.5 and track 1.0, PES-12 is used.

Figure 9:
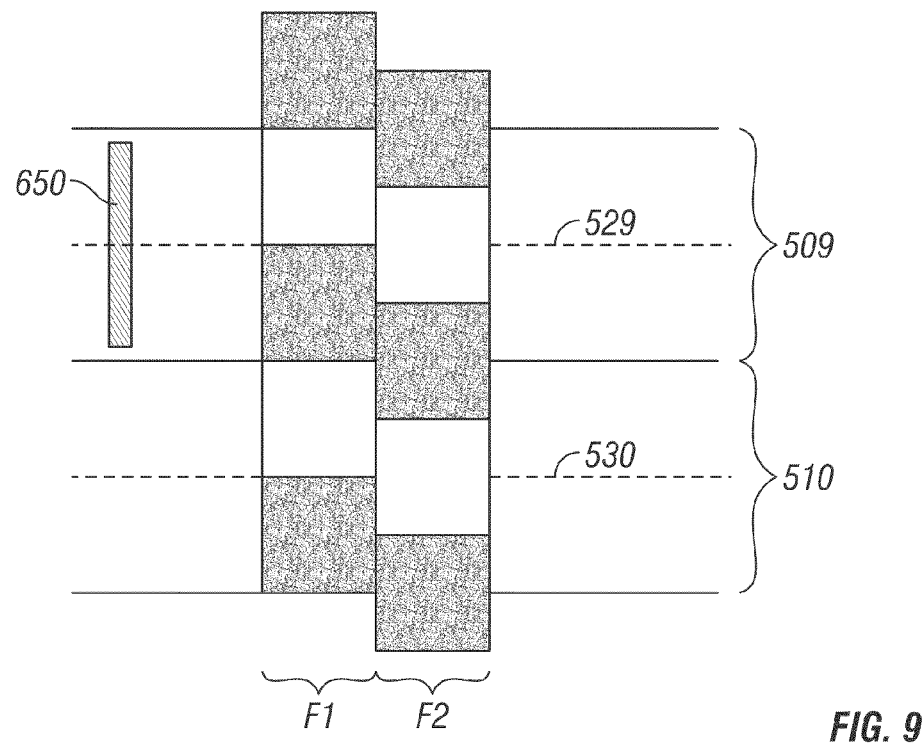
FIG. 9 is a schematic of an embodiment of the PES pattern wherein the PES blocks have a radial height of one-half a track width and the circumferentially adjacent fields are shifted radially relative to one another by one-half the radial height of the PES blocks.
Figure 10:
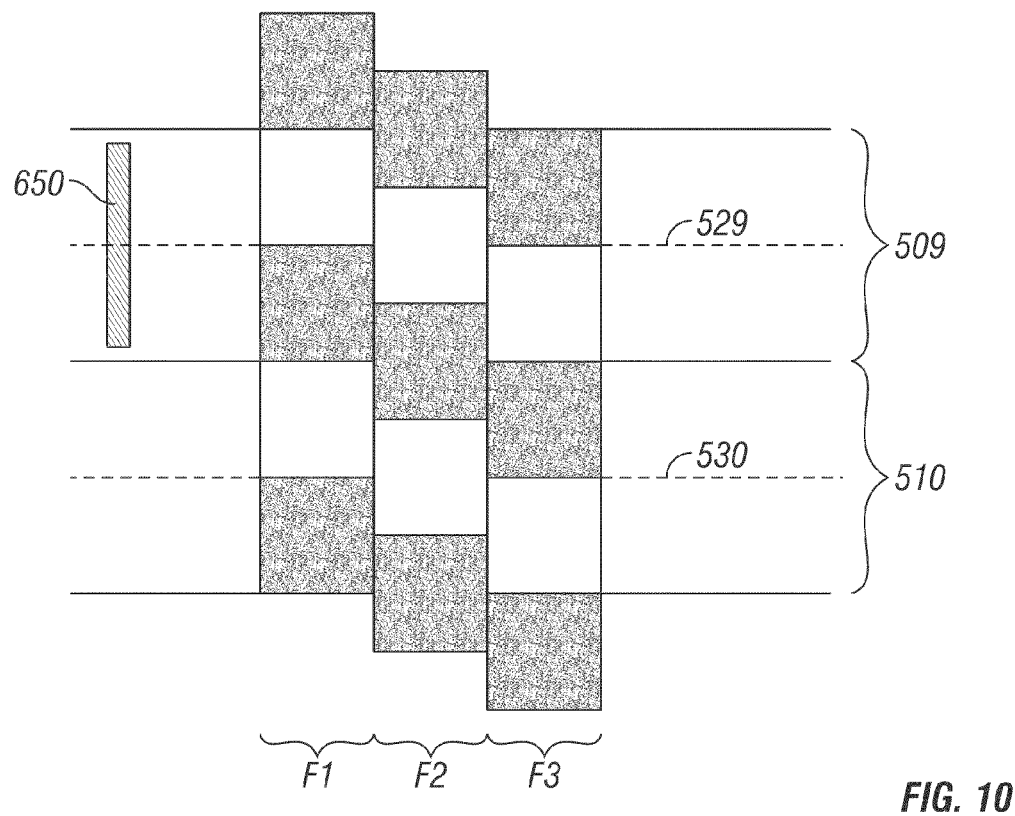
FIG. 10 is a schematic of an embodiment of the PES pattern wherein there are three contiguous circumferentially adjacent fields, with each field shifted radially relative to its neighboring fields by one-third the radial height of the PES blocks.

In the embodiment shown in FIG. 5, the radial height of the PES blocks is one track width or Tp, with field F2 shifted radially relative to field F1 and field F4 shifted radially relative to field F3 by the radial height of the PES blocks, i.e., Tp. However, the PES blocks may have a radial height of one-half Tp and field F2 may be shifted radially relative to field F1 by the radial height of the PES blocks, i.e., one-half Tp. This embodiment is depicted in FIG. 9 which shows the MR head 650 aligned generally at the centerline 529 of track 509. In the embodiment of FIG. 9, only two fields are required to provide the PES. FIG. 10 shows an embodiment wherein there are three contiguous circumferentially adjacent fields F1-F3, with each field shifted radially relative to its neighboring fields by one-third the radial height of the PES blocks.

In the preferred embodiment of the invention, the nondata servo regions, including the PES pattern 500 shown in FIG. 5, are portions of the disk recording layer that is formed of conventional "continuous" media, meaning that the magnetic recording layer is a continuous film of magnetizable material. Each PES block in field F1 is magnetized by a DC magnetic field that is applied by the servowriter for a time sufficient to define the circumferential length of the PES block, followed by a DC magnetic field of the opposite polarity applied by the servowriter to DC magnetize the circumferentially adjacent PES block in field F2. In this manner the PES blocks in circumferentially adjacent fields can be made essentially contiguous. In conventional continuous-media disks the concentric data tracks in data field 507 are not physically separated from one another and are not pre-formed in the recording layer, but are formed when the write fields from the write head create the magnetizations in the continuous magnetic layer. However, a continuous-media disk may also be a "discrete-track" disk, meaning that the concentric data tracks of continuous magnetic material are radially separated from one another by concentric nonmagnetic guard bands. Discrete-track magnetic recording disks are known in the art, as described for example in U.S. Pat. No. 4,912,585. In a discrete-track disk, the nonmagnetic guard bands may be trenches or grooves, or formed of nonmagnetic material, or contain magnetic material but have surfaces far enough below the surfaces of the data tracks to not adversely the readback signals from the data tracks.

Figure 11:
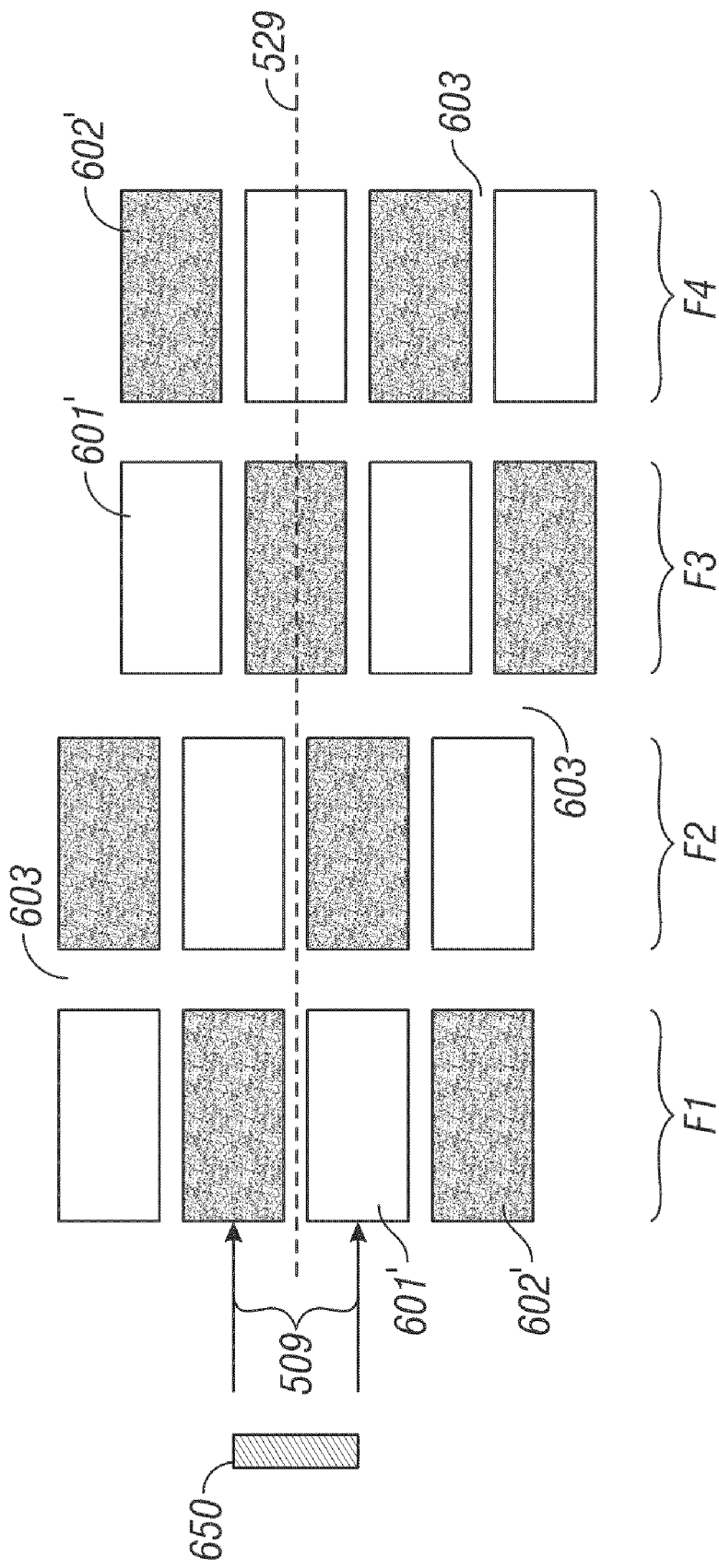
FIG. 11 is a schematic showing the four fields F1-F4 of the PES pattern according to an embodiment wherein the PES pattern contains discrete PES blocks physically separated from adjacent PES blocks by nonmagnetic spaces.

Magnetic recording disks with "patterned" media have been proposed to increase the data density. In patterned media, the magnetizable material on the disk is patterned into small isolated islands such that there is a single magnetic domain in each island or "bit". The single magnetic domains can be a single grain or consist of a few strongly coupled grains that switch magnetic states in concert as a single magnetic volume. This is in contrast to conventional continuous media wherein a single "bit" may have multiple magnetic domains separated by domain walls. To produce the required magnetic isolation of the patterned islands, the magnetic moment of the spaces between the islands must be destroyed or substantially reduced so as to render these spaces essentially nonmagnetic. In patterned media, the nondata servo regions are also patterned into discrete blocks separated by nonmagnetic spaces. It is also possible to fabricate a continuous-media disk wherein just the nondata regions are patterned. This type of continuous-media disk may have either conventional concentric data tracks, or discrete data tracks separated by nonmagnetic guard bands, but the nondata regions are patterned. Thus in another embodiment of the invention, the PES pattern contains discrete PES blocks physically separated from adjacent PES blocks by nonmagnetic spaces. FIG. 11 shows this embodiment with PES blocks 601', 602' magnetized perpendicularly in opposite directions, but separated from one another by nonmagnetic spaces 603.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A perpendicular magnetic recording disk comprising:
    a magnetic recording layer magnetizable generally perpendicular to the plane of the layer for the recording of data in a plurality of generally concentric circular data tracks, wherein the circular data tracks are radially spaced apart by a track pitch (Tp) radial spacing; and
    a plurality of nondata servo sectors extending generally radially across a plurality of the data tracks, the servo sectors including position error signal (PES) blocks forming a PES pattern comprising:
    a first field of PES blocks having a radial height of Tp and extending generally radially across the tracks, each PES block in the first field having a perpendicular magnetization in one and only one direction and opposite to the perpendicular magnetization of radially adjacent PES blocks in the first field; and
    a second field of PES blocks having a radial height of Tp and extending generally radially across the tracks, the second field being circumferentially adjacent to and shifted radially relative to the first field by Tp whereby each PES block in the second field is circumferentially aligned with a PES block in the first field, each PES block in the second field having a perpendicular magnetization in one and only one direction and opposite to both the perpendicular magnetization of radially adjacent PES blocks in the second field and to the perpendicular magnetization of the circumferentially adjacent PES block in the first field.

2. The disk of claim 1 wherein the PES pattern further comprises
    a third field of PES blocks having a radial height of Tp and extending generally radially across the tracks, the third field being circumferentially adjacent to and shifted radially relative to the second field by one-half Tp, each PES block in the third field having a perpendicular magnetization in one and only one direction and opposite to the perpendicular magnetization of radially adjacent PES blocks in the third field; and
    a fourth field of PES blocks having a radial height of Tp and extending generally radially across the tracks, the fourth field being circumferentially adjacent to and shifted radially relative to the third field by Tp whereby each PES block in the fourth field is circumferentially aligned with a PES block in the third field, each PES block in the fourth field having a perpendicular magnetization in one and only one direction and opposite to both the perpendicular magnetization of radially adjacent PES blocks in the fourth field and to the perpendicular magnetization of the circumferentially adjacent PES block in the third field.

3. The disk of claim 1 wherein the servo sectors include a synchronization pattern of circumferentially adjacent regions of alternate magnetization polarity, and wherein the circumferential length of the PES blocks is at least 3 times the circumferential length of the synchronization regions.

4. The disk of claim 1 wherein the magnetic recording layer in the region of the nondata servo sectors is continuous magnetic recording media, and wherein the second field is generally contiguous with the first field.

5. The disk of claim 4 wherein the concentric data tracks are discrete tracks radially separated from one another by concentric nonmagnetic guard bands.

6. The disk of claim 1 wherein the magnetic recording layer in the region of the nondata servo sectors is patterned magnetic recording media, and wherein the PES blocks are separated from one another by nonmagnetic spaces.

7. A perpendicular magnetic recording disk drive comprising:
the disk of claim 1;
a magnetoresistive read head for detecting the PES blocks; and
a PES decoder for decoding the signal from the read head in response to detection of the PES blocks, the PES decoder comprising a matched filter for a single-step waveform of the signal representing the transition from a PES block in the first field to the circumferentially adjacent PES block in the second field.

8. A perpendicular magnetic recording disk drive comprising:
a perpendicular magnetic recording disk comprising:
a magnetic recording layer of continuous magnetic recording media magnetizable generally perpendicular to the plane of the layer for the recording of data in a plurality of generally concentric circular data tracks, wherein the circular data tracks are radially spaced apart by a track pitch (Tp) radial spacing; and
a plurality of nondata servo sectors extending generally radially across a plurality of the data tracks, the servo sectors including a synchronization pattern of circumferentially adjacent regions of alternate magnetization polarity and a position error signal (PES) pattern, the PES pattern comprising:
a first field of PES blocks having a radial height of Tp and extending generally radially across the tracks, each PES block in the first field having a perpendicular magnetization in one and only one direction and opposite to the perpendicular magnetization of radially adjacent PES blocks in the first field;
a second field of PES blocks having a radial height of Tp extending generally radially across the tracks, the second field being circumferentially adjacent to and shifted radially relative to the first field by Tp whereby each PES block in the second field is circumferentially aligned with a PES block in the first field, each PES block in the second field having a perpendicular magnetization in one and only one direction and opposite to both the perpendicular magnetization of radially adjacent PES blocks in the second field and to the perpendicular magnetization of the circumferentially adjacent PES block in the first field;
a third field of PES blocks having a radial height of Tp and extending generally radially across the tracks, the third field being circumferentially adjacent to and shifted radially relative to the second field by one-half Tp, each PES block in the third field having a perpendicular magnetization in one and only one direction and opposite to the perpendicular magnetization of radially adjacent PES blocks in the third field; and
a fourth field of PES blocks having a radial height of Tp and extending generally radially across the tracks, the fourth field being circumferentially adjacent to and shifted radially relative to the third field by Tp whereby each PES block in the fourth field is circumferentially aligned with a PES block in the third field, each PES block in the fourth field having a perpendicular magnetization in one and only one direction and opposite to both the perpendicular magnetization of radially adjacent PES blocks in the fourth field and to the perpendicular magnetization of the circumferentially adjacent PES block in the third field; and
wherein the circumferential length of the PES blocks is at least 3 times the circumferential length of the synchronization regions;
a magnetoresistive read head for detecting the PES blocks; and
a PES decoder for decoding the signal from the read head in response to detection of the PES blocks, the PES decoder comprising a matched filter for a single-step waveform of the signal representing the transition from a PES block in the first field to the circumferentially adjacent PES block in the second field and the transition from a PES block in the third field to the circumferentially adjacent PES block in the fourth field.

* * * * *